(12) United States Patent
Frank et al.

(10) Patent No.: US 8,600,356 B2
(45) Date of Patent: Dec. 3, 2013

(54) AUTHENTICATION IN A ROAMING ENVIRONMENT

(75) Inventors: Edward H. Frank, Atherton, CA (US); Mark Buer, Gilbert, AZ (US); Jeyhan Karoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/480,548

(22) Filed: May 25, 2012

(65) Prior Publication Data

US 2012/0289198 A1 Nov. 15, 2012

Related U.S. Application Data

(63) Continuation of application No. 11/221,466, filed on Sep. 7, 2005, now Pat. No. 8,190,124.

(60) Provisional application No. 60/621,578, filed on Oct. 22, 2004.

(51) Int. Cl.
*H04M 3/16* (2006.01)
*H04W 36/00* (2009.01)
*H04W 4/00* (2009.01)
*H04B 7/24* (2006.01)
*H04K 1/00* (2006.01)

(52) U.S. Cl.
USPC .......... 455/411; 455/435.1; 455/436; 455/39; 455/432.1; 455/432.3; 370/328; 370/331; 380/247; 380/255; 380/260

(58) Field of Classification Search
USPC .......... 455/411, 435.1, 436, 39, 432.1, 432.3; 370/328, 331; 380/247, 255, 260
See application file for complete search history.

(56) References Cited

U.S. PATENT DOCUMENTS

| | | |
|---|---|---|
| 6,115,608 A | 9/2000 | Duran et al. |
| 6,198,823 B1 | 3/2001 | Mills |
| 6,556,820 B1 | 4/2003 | Le et al. |
| 6,856,800 B1 | 2/2005 | Henry et al. |
| 7,231,046 B1 | 6/2007 | Einola et al. |
| 2002/0184217 A1 | 12/2002 | Bisbee et al. |
| 2003/0054823 A1* | 3/2003 | Choi et al. .................... 455/436 |
| 2003/0063584 A1 | 4/2003 | Sayeedi |
| 2003/0105962 A1 | 6/2003 | Le et al. |
| 2003/0145091 A1* | 7/2003 | Peng et al. .................... 709/229 |
| 2004/0103275 A1 | 5/2004 | Ji et al. |
| 2004/0153556 A1 | 8/2004 | Claes et al. |
| 2004/0258022 A1 | 12/2004 | Julka et al. |

* cited by examiner

*Primary Examiner* — Ariel Balaoing
(74) *Attorney, Agent, or Firm* — Sterne, Kessler, Goldstein & Fox, P.L.L.C.

(57) ABSTRACT

One embodiment of the invention provides a mobile communication network architecture that includes a first base station (e.g., a first base station controller and/or a first transceiver station), a second base station (e.g., a second base station controller and/or a second transceiver station), a mobile client, and a server coupled to the mobile client via either the first base station controller or the second base station. The first base station is coupled to an authentication center that authenticates an intended user so that the user can communicate a message between the mobile client and the server via the first base station. A credential (or status) of the authentication made at the authentication center is then transmitted from the first base station to the second base station when the mobile client moves to utilize the second base station to communicate with the server.

20 Claims, 8 Drawing Sheets

AUTHENTICATION IN A ROAMING ENVIRONMENT

CROSS REFERENCE TO RELATED APPLICATIONS

This application is a continuation of U.S. patent application Ser. No. 11/221,466 filed Sep. 7, 2005, now allowed. This application claims priority to and the benefit of U.S. Provisional Application No. 60/621,578, filed Oct. 22, 2004, and U.S. patent application Ser. No. 11/221,466, both of which are hereby incorporated by reference in their entireties.

BACKGROUND OF THE INVENTION

1. Field of the Invention

The invention relates generally to the field of data communications and, more particularly, to systems and methods for authenticating an intended user in a roaming environment.

2. Background Art

Currently, cables and wires are predominately used in communication networks for transferring information such as voice, video, data, etc. from one device to another. Devices on a communication network can be generally categorized as two types: servers and clients. Those devices that provide services to other devices are servers; the devices that connect to and utilize the provided services are clients. Typically, cable or wire clients operate within a defined geographical area to report information back to the server.

However, there is a growing desire to have network clients be portable or to have a mobile client that can operate beyond a defined geographical area. For example, a typical mobile client can send and receive information wirelessly while moving (or roaming) from one defined geographical area to another. To ensure that the mobile client is connected to its mobile communication network, a handover (or handoff) mechanism is used to switch an on-going wireless communication session from one network geographical area (or cell) to another.

Since information such as voice, video, and data are transmitted and received wirelessly in a mobile communication network, this information can be intercepted by an impersonator posing as an intended user. Thus, authentication of the intended user is a very important element of a mobile communication network. One way to authenticate an intended user to a mobile communication network and to allow the intended user to roam from one geographical area to another would be to allow all users to enter the mobile communication network and to authenticate and identify the intended user at a central authentication center (in a central core) of the mobile communication network. However, using the central authentication center to authenticate and identify the intended user would not be ideal because this approach would allow an impersonator to also enter the central core of the mobile communication network and possibly tamper with the mobile communication network. Accordingly, it would be desirable to provide a system and method that can authenticate and identify the intended user to the mobile communication network outside the central core of the mobile communication network. In addition, there is a need to ensure that a mobile client of the authenticated user can switch or roam from one geographical area to another with little to no notice and/or interaction by the authenticated user.

BRIEF SUMMARY OF THE INVENTION

The invention relates to systems and associated methods for authenticating an intended user in a roaming environment. Embodiments of the present invention authenticate an intended user of a mobile client outside a central core of a mobile communication network and allows a credential of the authenticated user to roam with the mobile client as the mobile client moves from one geographical area to another.

In an exemplary embodiment according to the present invention, a communication network authenticates a user of a mobile client and allows the mobile client to communicate with a server as the user of the mobile client roams from one communication cell to another communication cell. The communication network includes a first base station controller, a second base station controller, an authentication center, and an authentication interface. The first base station controller is coupled to a first transceiver station that defines a first communication cell. The authentication center is coupled to the first base station controller. The second base station controller is coupled to a second transceiver station that defines a second communication cell. The authentication center authenticates the user of the mobile client to access the first base station controller. The authentication interface is coupled between the first base station controller and the second base station controller. The authentication interface allows a credential of an authentication of the user at the authentication center to be moved to the second base station controller as the user of the mobile client roams from the first communication cell to the second communication cell.

In another exemplary embodiment according to the present invention, a communication network architecture for authenticating a user in a roaming environment is provided. The communication network architecture includes a server, a mobile client, a first transceiver station, a second transceiver station, an authentication center, and an authentication interface. The first transceiver station defines a first communication area within which the mobile client can communicate with the server. The second transceiver station defines a second communication area within which the mobile client can communicate with the server. The authentication center is coupled to the first transceiver station and authenticates an intended user of the mobile client to the first transceiver station so that the mobile client can communicate with the server via the first transceiver station. The authentication interface is coupled between the first transceiver station and the second transceiver station and allows a credential of the authentication made at the authentication center to be transmitted from the first transceiver station to the second transceiver station when the mobile client moves to utilize the second transceiver station for communication with the server.

In yet another exemplary embodiment according to the present invention, a method for authenticating a user in a roaming environment is provided. The method includes coupling an authentication center to a first base station controller and providing an authentication interface between the first base station controller and a second base station controller. The first base station controller and the second base station controller respectively control a first transceiver station and a second transceiver station. In addition, the method identifies a particular authentication of an intended user of a mobile client at the authentication center, creates an appropriate authentication credential associated with the particular authentication, and communicates the credential from the first base station controller to the second base station controller via the authentication interface. Upon receiving by the second base station controller of the credential, the method recreates the authentication of the intended user based on the credential received by the second station controller.

In still another exemplary embodiment according to the present invention, a method for authenticating a user of a mobile client and for allowing the mobile client to communicate with a server as the user of the mobile client roams from one communication cell to another communication cell is provided. The method includes coupling an authentication center to a first transceiver station that defines a first communication cell, authenticating the user of the mobile client to access the first transceiver station at the authentication center, and providing an authentication interface between the first transceiver station and a second transceiver station that defines a second communication cell. An appropriate authentication credential associated with the authentication of the user at the authentication is then created. The credential is then communicated from the first transceiver station to the second transceiver station via the authentication interface. Then, upon receiving by the second transceiver station of the credential, the method recreates the authentication of the user based on the credential received by the second transceiver station.

A more complete understanding of the authentication of a user of a mobile client in a roaming environment will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS/FIGURES

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
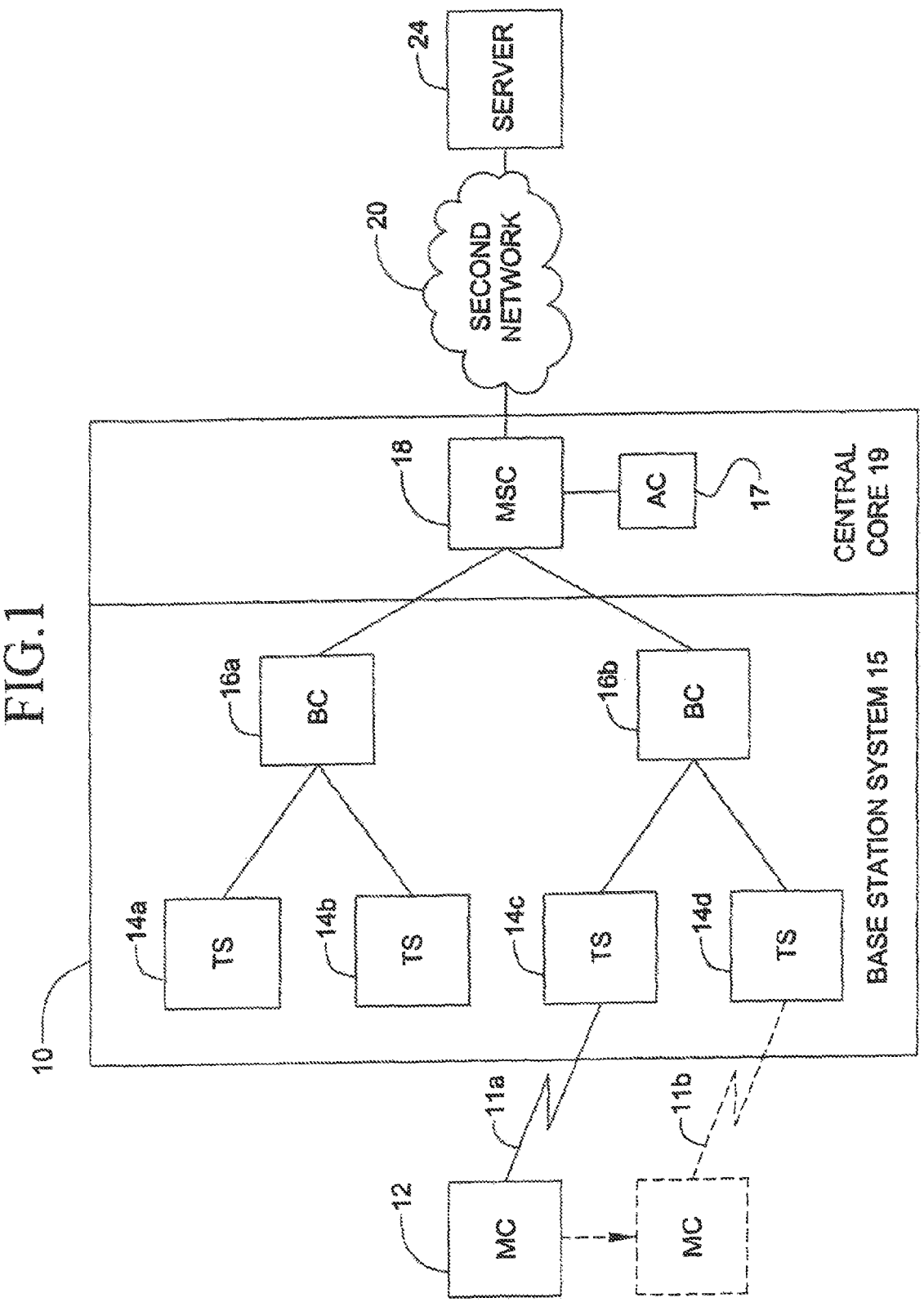
FIG. 1 is a schematic diagram of a mobile communication network architecture pursuant to aspects of the invention.

FIG. 1 is a block diagram of a mobile communication network architecture that uses a smartcard (e.g., a subscriber identity module card) for authentication and/or encryption. Exemplary embodiments of the present invention can be applied to the network architecture of FIG. 1, as well as other suitable architectures.

The network architecture of FIG. 1 includes mobile network 10 that facilitates communications between one or more mobile clients 12 and one or more servers 24. Mobile network 10 may be a wireless communications system that supports the Global System for Mobile Communications (GSM) protocol. However, other multi-access wireless communications protocol, such as General Packet Radio Services (GPRS), High Data Rate (HDR), Wideband Code Division Multiple Access (WCDMA) and/or Enhanced Data Rates for GSM Evolution (EDGE), may also be supported. Mobile client 12 may be any device that is adapted for wireless communications with mobile network 10, such as a cellular telephone, pager, personal digital assistant (PDA), vehicle navigation system, and/or portable computer.

Mobile network 10 includes base station system 15 and central core 19. Base station system 15 includes one or more transceiver stations 14 (e.g., 14a, 14b, 14c, and/or 14d) and one or more base station controllers 16 (e.g., 16a and/or 16b). Central core 19 includes main switching center 18 and authentication center 17. Mobile network 10 connects mobile client 12 to one or more servers either directly (not shown) and/or through second network 20, such as a Public Switched Telephone Network (PSTN), an Integrated Services Digital Network (ISDN), a Packet Switched Public Data Network (PSPDN), a Circuit Switched Public Data Network (CSPDN), a local area network (LAN), the Internet, etc. Mobile network 10 is operated by a carrier that has an established relationship with an intended user (or subscriber) of mobile client 12 to use the wireless services provided through mobile network 10.

Figure 2:
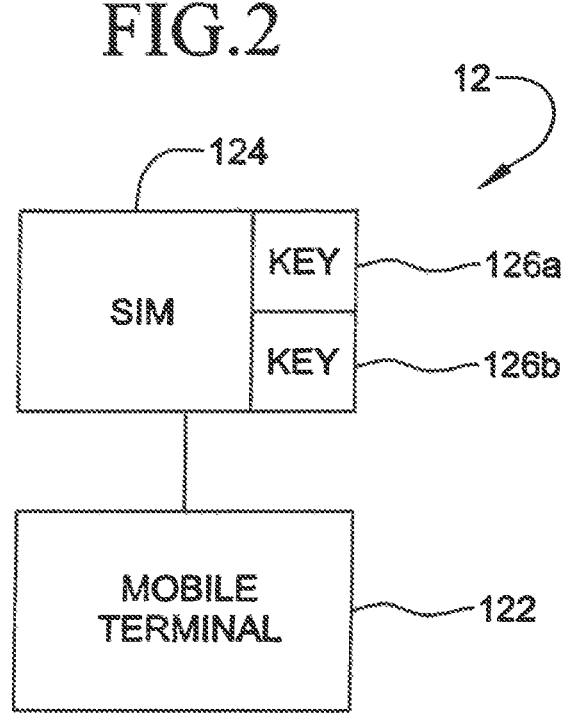
FIG. 2 is a more detailed schematic diagram of a mobile client of FIG. 1.

Referring now to FIG. 2, mobile client 12 includes mobile terminal 122 (e.g., a mobile equipment or a phone) and smartcard 124. More specifically, smartcard 124 of FIG. 2 is a Subscriber Identity Module (SIM). SIM (or SIM card) 124 contains encryption key 126a that encrypts voice and data transmissions to and from mobile network 10 and authentication key 126b that specifies an intended user so that the intended user can be identified and authenticated to mobile network 10 supplying the mobile services, SIM 124 can be moved from one mobile terminal 122 to another terminal (not shown) and/or different SIMs can be inserted into any terminal, such as a GSM compliant terminal (e.g., a GSM phone).

To provide additional security, mobile terminal 122 may include an International Mobile Equipment Identity (IMEI) that uniquely identifies mobile terminal 122 to network 10. SIM card 124 may be further protected against unauthorized use by a password or personal identity number.

Referring now back to FIG. 1, each transceiver station 14a, 14b, 14c, 14d includes a radio transceiver that defines a geographical coverage area or cell and provides radio-link protocols with mobile client 12. Base station controllers 16a, 16b manage the radio resources for transceiver stations 14a, 14b, 14c, 14d. Base station controllers 16a, 16b handle radio-channel setup, frequency hopping, and handovers of transceiver stations 14a, 14b, 14c, 14d as the mobile client moves from one transceiver station's coverage area (or cell) to another transceiver station's coverage area (e.g., the coverage area of transceiver station 14d).

In FIG. 1, mobile client 12 is shown to be coupled with transceiver station 14c via radio link 11a. Further, FIG. 1 shows that mobile client 12 may leave the coverage area (or cell) of transceiver station 14c and roam to the coverage area of transceiver station 14d via radio link 11b, as is schematically indicated.

Central core (or component) 19 of mobile network 10 includes main switching center 18. Main switching center 18 acts like a normal switching node, such as a switching node in a PSTN or ISDN, and additionally provides all the functionality needed to handle a mobile user (subscriber), such as registration, authentication, location updating, handovers, and call routing to a roaming subscriber. In FIG. 1, it is main switching center 18 that provides the connection of mobile client 12 to second network 20 (such as the LAN, the PSTN, the ISDN etc).

Figure 3:
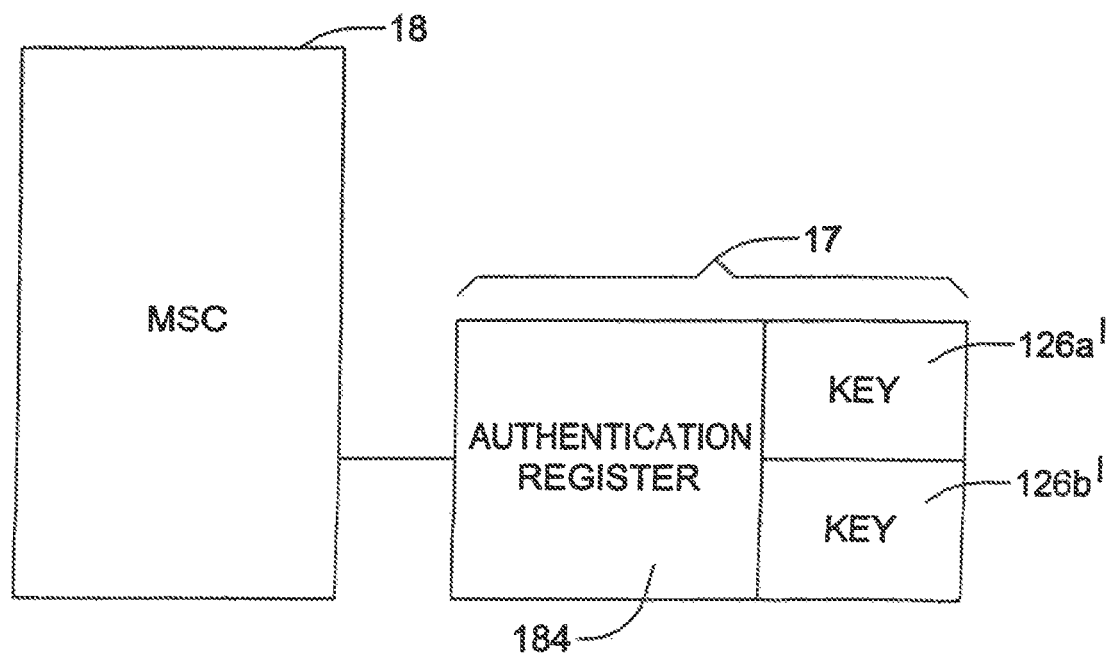
FIG. 3 is a more detailed schematic diagram of a main switching center and an authentication center of FIG. 1.

Referring now to FIG. 3, main switching center 18 is shown to be coupled to (or to include) authentication center 17. Authentication center 17 includes authentication register 184. Authentication register 184 is a protected database that stores copies 126a', 126b' of the secret keys (e.g., 126a, 126b) stored in each intended user's (or subscriber's) SIM card (e.g., 124), which are used for authentication of an intended user and encryption of data transmitted over mobile network 10.

Moreover, to provide an addition level of security, authentication center 17 (or another component of mobile network 10) may include another database (not shown) that contains a list of all valid mobile terminals (e.g., 122 of FIG. 2) on network 10, where each mobile client (e.g., 12) is identified by its International Mobile Equipment Identity (IMEI). An IMEI is marked as invalid if it has been reported stolen or is not type approved.

Referring now back to FIG. 1, the fact the entire area covered by mobile network 10 is divided into cells (as defined by transceiver stations 14a, 14b, 14c, 14d) necessitates an implementation of a handover (or handoff) mechanism.

Specifically, in the context of the present application, a handover (or handoff) mechanism is a mechanism for switching an on-going communication session on a mobile client (e.g., mobile client 12) from one transceiver station (e.g., transceiver station 14c) and/or radio link (e.g., link 11a) to another transceiver station (e.g., station 14d) and/or radio link (e.g., link 11b). Typically, there are four different types of handovers that may occur. The four types involve switching an on-going session: (1) between radio links or channels (e.g., time slots) in the same transceiver station; (2) between transceiver stations under the control of the same base station controller; (3) between base station controllers under the control of the same main switching center; and (4) between different main switching centers.

The first two types of handovers can be categorized as internal handovers and involve only one base station controller. The last two types of handovers can be categorized as external handovers and are handled by the main switching centers involved.

Handovers can be initiated by either the mobile client or the main switching center (as a means of traffic load balancing). During its idle time, the mobile client (e.g., mobile client 12) scans the broadcast control channels of a plurality of neighboring transceiver stations (e.g., transceiver stations 14), and forms a list of best transceiver station candidates for possible handover, based on the received signal strength. This information may be periodically passed to the base station controller and/or main switching center and is used for determining when a handover should take place.

There are two basic methods used to determine when a handover should take place. One method sets a minimum acceptable performance level and gives precedence to power control over handover control. That is, when the signal degrades beyond a certain level, the power level of the mobile client is increased first. If further power increases do not improve the signal, then a handover is made. The other method uses handover first to try to maintain or improve a certain level of signal quality at the same or lower power level. Thus, this method gives precedence to handover control over power control.

Since the radio medium can be accessed by anyone, authentication of users to prove that they are who they claim to be, is a very important element of a mobile network. Authentication involves two functional entities, a SIM card in a mobile client and an authentication center in the mobile network. Each intended user (or subscriber) is given a secret key, one copy of which is stored in the SIM card and the other in the authentication center. During authentication, the authentication center generates a random number that it sends to the mobile client. Both the mobile client and the authentication center then use the random number, in conjunction with the subscriber's secret key and an authentication (or ciphering) algorithm, to generate a signed response that is sent back to the authentication center. If the number sent by the mobile client is the same as the one calculated by the authentication center, the intended user is authenticated.

Specifically, referring now back to FIGS. 1, 2, and 3, mobile network 10 can be a GSM compliant network that authenticates the identity of an intended user through the use of a challenge-response mechanism. A 128-bit random number is sent to mobile client 12 from authentication center 17. Mobile client 12 computes a 32-bit signed response based on the random number sent to mobile client 12 with an authentication algorithm using individual subscriber authentication key 126b. Upon receiving the signed response from mobile client 12, authentication center 17 repeats the calculation to verify the identity of the user. Note that individual subscriber authentication key 126b is not transmitted over the radio channel. It should only be present in SIM card 124, as well as authentication register 184. If the signed response received by authentication center 17 agrees with the calculated value, mobile client 12 has been successfully authenticated and may continue. If the values do not match, the connection to network 10 is terminated.

In addition, SIM card 124 of FIGS. 1, 2, and 3 contains encryption key 126a. Encryption key 126a is used to encrypt and decrypt the data transmitted between mobile client 12 and mobile network 10. The encryption of the voice and data communications between mobile client 12 and network 10 is accomplished through use of an encryption algorithm. An encrypted communication is initiated by an encryption request command from mobile network 10. Upon receipt of this command, mobile client 12 begins encryption and decryption of data using the encryption algorithm and the encryption key 126a.

Further, copies 126a', 126b' of the keys (and/or another key) in authentication center 17 (and/or another center) may be used to revoke (or erase) keys 126a, 126b in SIM card 124. In one embodiment, keys 126a, 126b (or another key) in SIM card 124 may be revoked wirelessly via mobile network 10.

Moreover, authentication center 17 may be used to wirelessly burn and/or write a new authentication key into SIM card 124.

Lastly, one or both authentication and/or encryption keys 126a, 126b of SIM card 124 may have a private key and a related but different public key, a copy of which is made available outside SIM card 124. A challenge may then be supplied to SIM card 124 and a response is generated using only the private key. The response may be checked by the use of the related public key. Thus, if the private key is held only within SIM card 124 then only SIM card 124 can generate an authentication response that would work with the public key value.

As envisioned, an embodiment of the present invention authenticates an intended user of a mobile client outside a central core (e.g., core 19 of FIG. 1) of a mobile communication network and allows for a credential of the authentication (including a revocation of the authentication) to roam with the mobile client as the mobile client moves from one geographical area to another.

Figure 4:
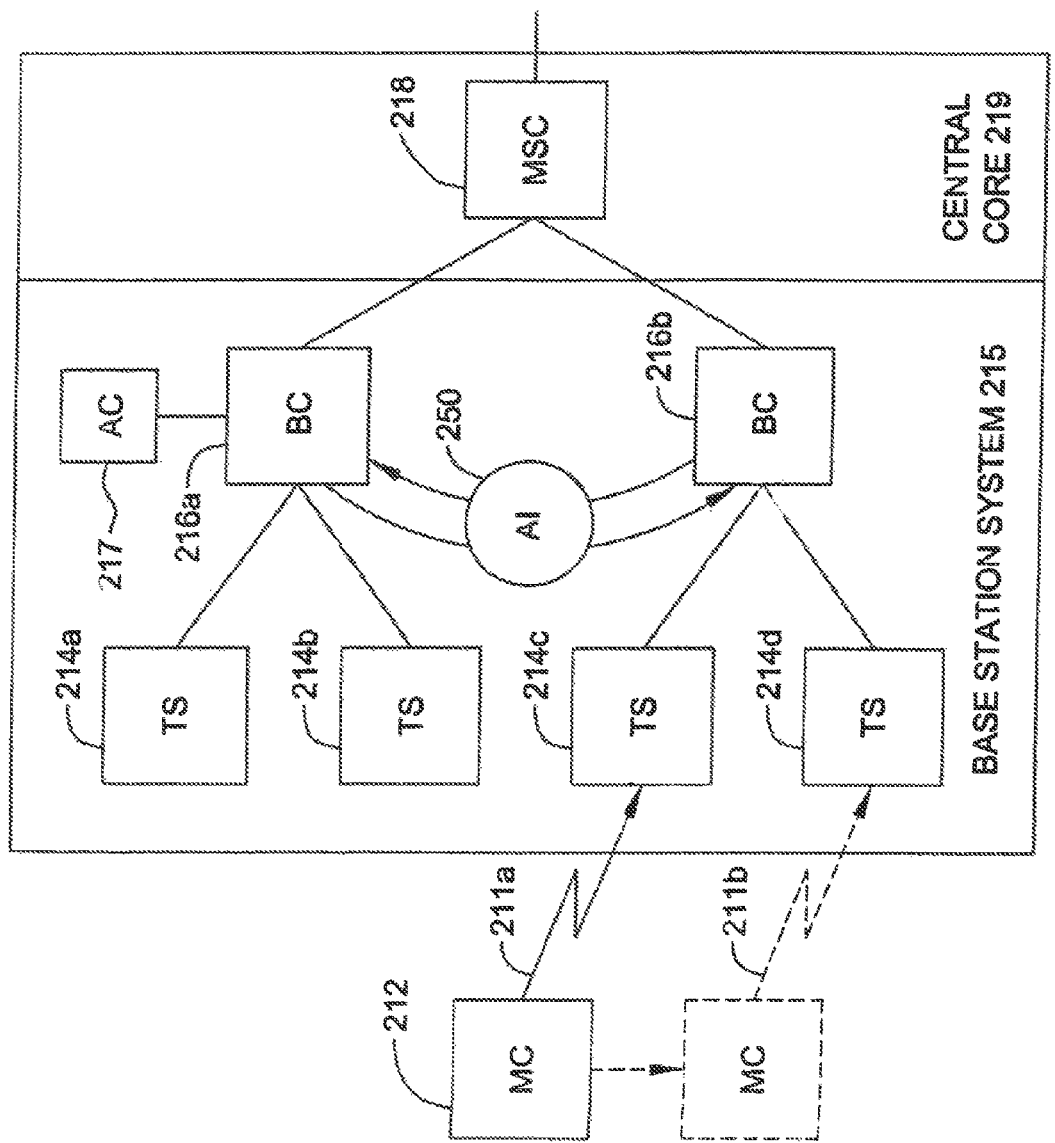
FIG. 4 is a schematic diagram of another mobile communication network architecture pursuant to aspects of the invention.

Referring to FIG. 4, a mobile communication network architecture pursuant to the present invention includes base station system 215 coupled between mobile client 212 and central core 219 of a mobile communication network.

Central core 219 includes main switching center 218. Base station system 215 includes transceiver stations 214 (e.g., 214a, 214b, 214c, and/or 214d) and base station controllers 216 (e.g., 216a and/or 216b). Central core 219 and base station system 215 may be a wireless communication central core and base station system similar to central core 19 and base station system 15 of FIG. 1, as well as other suitable central cores and base station systems.

However, unlike FIG. 1, the embodiment of FIG. 4 shows that base station system 215 further includes authentication center 217. Authentication center 217 is coupled to (or directly connected to) base station controller 216a. Authentication center 217 includes an authentication register (similar to register 184 of FIG. 3) that stores copies (e.g., 126a', 126b') of the secret keys (e.g., 126a, 126b) stored in a SIM card (e.g., 124) of mobile client 212, which are used for authenticating an intended user.

in FIG. 4, since authentication center 217 is shown to be located outside central core 219, an intended user can first be authenticated outside central core 219. Thus, an un-authenticated user is prevented from reaching central core 219 prior to being first authenticated at authentication center 217 and an impersonator of the intended user is prevented from entry into central core 219 and tampering with components of central core 219.

Alternatively or in addition of the embodiment of FIG. 4, if the credential of the intended user is to be revoked and/or if the mobile client 212 is lost, another authentication center, e.g., at central core 219 communicates this revocation information to authentication center 217. In particular, the revocation information can be first provided to the authentication center at central core 219 and then all the provided revocation information can be periodically provided and/or broadcasted to authentication center 217 and/or other authentication centers located away from central core 219.

As is also shown in FIG. 4, mobile client 212 is coupled with transceiver station 214a via radio link 211a. During a roaming operation, mobile client 212 may leave the coverage area (or cell) of transceiver station 214a and roam to the coverage area of transceiver station 214c via radio link 211b, as is schematically indicated. As discussed above and shown in FIG. 4, transceiver station 214a and transceiver station 214b are coupled to authentication center 217 via base station controller 216a. Thus, since both the transceiver station 214a and transceiver station 214b are under the control of base station controller 216a, it should be understood to those skilled in the art that the intended user can roam from transceiver station 214a to transceiver station 214b without having to be re-authenticated. In addition, to ensure that the intended user does not have to unnecessarily re-authenticate, the embodiment of FIG. 4 includes authentication interface 250 so that a credential of the authentication of the intended user at authentication center 217 can be exported to base station controller 216b as the intended user roams to transceiver station 214c (or transceiver station 214d).

Specifically, authentication interface 250 is used to export and import a credential for indicating an authentication (and/or revocation) of an intended user that had occurred on authentication center 217. Authentication interface 250 has two complementary actions: (1) export authentication credential action and (2) import authentication credential action. When the export authentication credential action is invoked, the appropriate authentication credential associated with the authentication of the intended user is created on base station controller 216a and communicated to base station controller 216b. Conversely, when the import authentication credential action is invoked, the appropriate authentication credential associated with the authentication is received from base station controller 216a and the authentication of the intended user is recreated on base station controller 216b. Thus, since the authentication (and/or a revocation) can be recreated on base station controller 216b, the intended user does not have to be re-authenticated when mobile client 212 roams to the coverage area of transceiver station 214c via radio link 211b (or transceiver station 214d).

Figure 5:
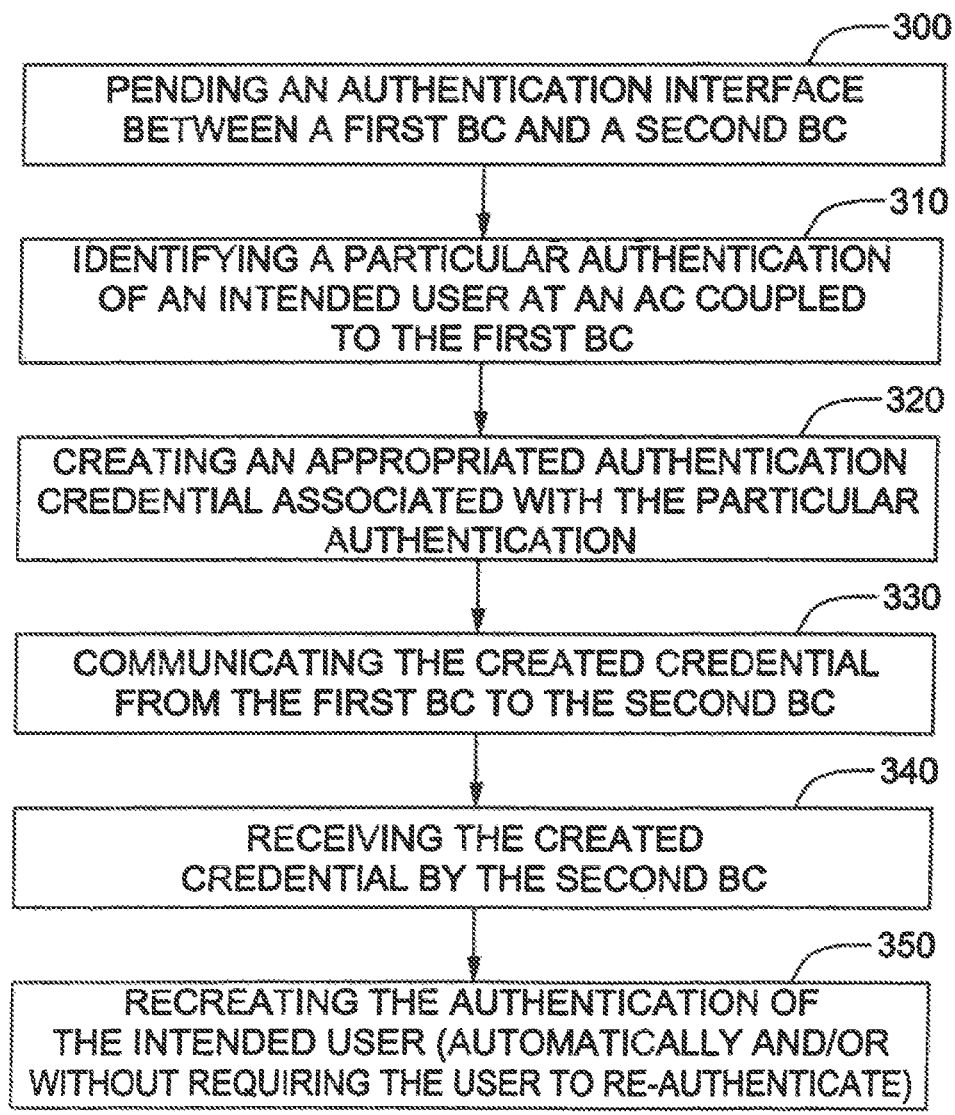
FIG. 5 is a flowchart representative of an embodiment of operations pursuant to aspects of the invention.

In general, according to the foregoing, the invention provides a method for exporting and importing an authentication credential in a roaming environment, as diagramed in FIG. 5. At block 300, an authentication interface between a first base station controller and a second base station controller is provided. At block 310, a particular authentication of an intended user at an authentication center coupled to the first base station controller is identified. At block 320, the first base station controller creates an appropriate authentication credential associated with the authentication of the intended user. At block 330, the first base station controller communicates the created credential to the second base station controller. At block 340, the second base station controller receives from the first base station controller the created credential. Then, at block 350, the authentication of the intended user is recreated at the second base station controller using the received credential (automatically and/or without requiring the intended user to re-authenticate as the user's mobile client roams or moves to the transceiver stations of the second base station controller). Thus, the method of FIG. 5 allows the authentication of the intended user to be recorded and provides the ability to move this authentication (including a revocation of this authentication) to a new base station controller as the mobile client roams between different coverage areas.

Figure 6:
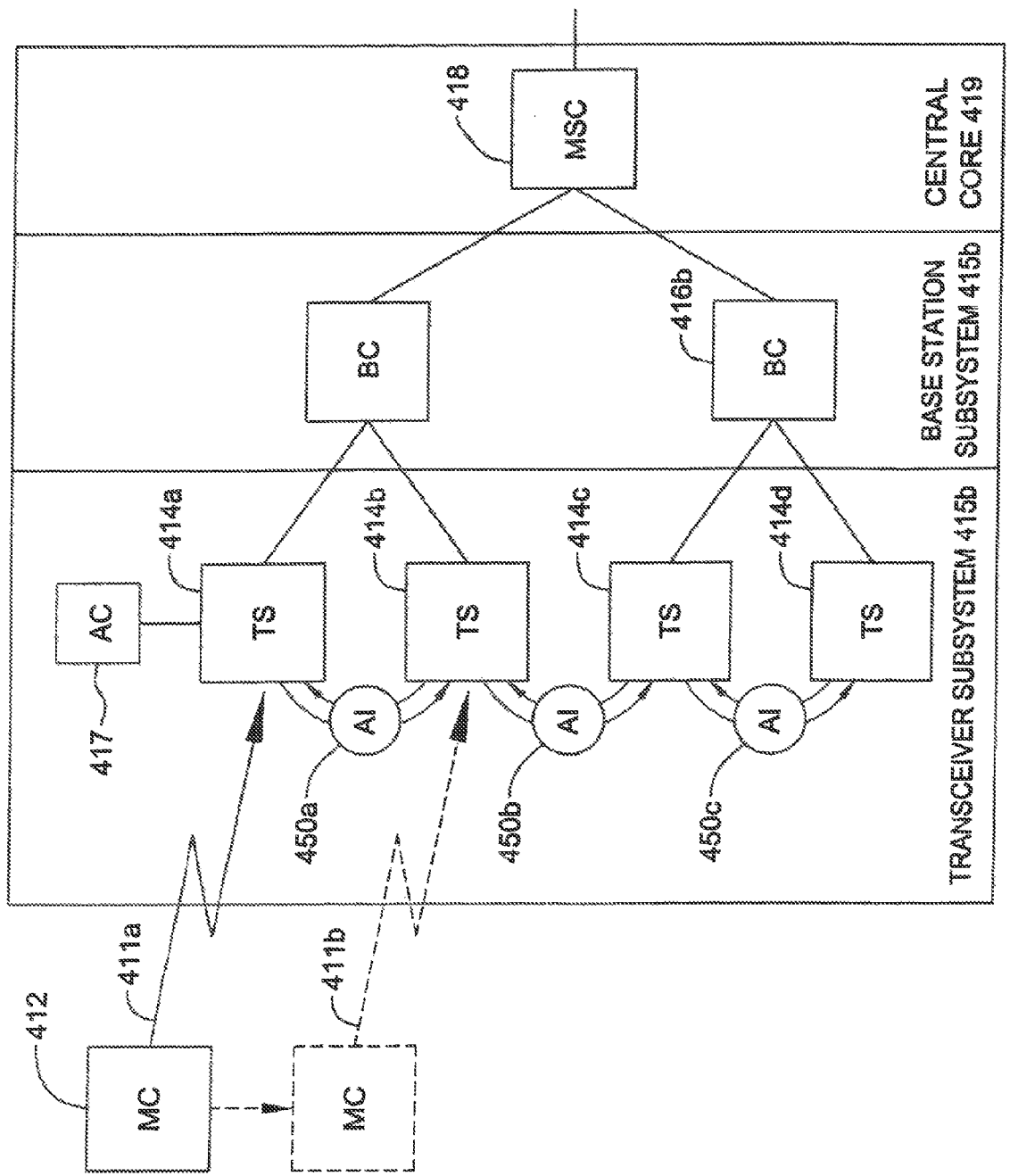
FIG. 6 is a schematic diagram of yet another mobile communication network architecture pursuant to aspects of the invention.

Referring to FIG. 6, another mobile communication network architecture pursuant to the present invention is shown. The network architecture of FIG. 6 includes transceiver subsystem 415a and base station subsystem 415b. Both transceiver subsystem 415a and base station subsystem 415b are coupled between mobile client 412 and central core 419 of a mobile communication network.

Central core 419 includes main switching center 418. Transceiver system 415a includes transceiver stations 414 (e.g., 414a, 414b, 414c, and/or 414d), and base station subsystem 415b includes base station controllers 416 (e.g., 416a and/or 416b). In addition, transceiver system 415a also includes authentication center 417 that is coupled to (or directly connected to) transceiver station 414a. Authentication center 417 includes an authentication register (similar to register 184 of FIG. 3) that stores copies (e.g., 126a', 126b') of the secret keys (e.g., 126a, 126b) stored in a SIM card (e.g., 124) of mobile client 412, which are used for authenticating an intended user.

Similar to the embodiment shown in FIG. 4, since authentication center 417 of FIG. 6 is shown to be located outside central core 419, an intended user can first be authenticated outside central core 419. Thus, an un-authenticated user is prevented from reaching central core 419 prior to being first authenticated at authentication center 417 and an impersonator of the intended user is prevented from entry into central core 419 and tampering with components of central core 419.

In addition, since authentication center 417 is further shown in FIG. 6 to be located outside base station subsystem 415*b*, an intended user can also be first authenticated outside base station subsystem 415*b*. Thus, an un-authenticated user is further prevented from reaching base station subsystem 415*b* prior to being first authenticated at authentication center 417 and an impersonator of the intended user is prevented from entry into base station subsystem 415*b* and tampering with components of base station subsystem 415*b*, such as base station controllers 416*a*, 416*b*.

As is also shown in FIG. 6, mobile client 412 is coupled with transceiver station 414*a* via radio link 411*a*. During a roaming operation, mobile client 412 may leave the coverage area (or cell) of transceiver station 414*a* and roam to the coverage area of transceiver station 414*b* via radio link 411*b*, as is schematically indicated. To ensure that the intended user does not have to unnecessarily re-authenticate, the embodiment of FIG. 6 includes authentication interface 450*a* so that a credential of the authentication of the intended user at authentication center 417 can be exported to transceiver station 414*b*. In addition, FIG. 6 shows second authentication interface 450*b* for exporting the credential (and/or another credential) of the authentication at the authentication center 417 to transceiver station 414*c* and third authentication interface 450*c* for exporting the credential (and/or another credential) of the authentication to transceiver station 414*d*.

Specifically, authentication interfaces 450*a*, 450*b*, 450*c* are used to export and import a credential for indicating an authentication (and/or revocation) of an intended user that had occurred on authentication center 417. Each authentication interface 450 has two complementary actions: (1) export authentication credential action and (2) import authentication credential action. For example, when the export authentication credential action is invoked, the appropriate authentication credential associated with the authentication of the intended user is created on transceiver station 414*a* and communicated to transceiver station 414*b*. Conversely, when the import authentication credential action is invoked, the appropriate authentication credential associated with the authentication is received from transceiver station 414*a* and the authentication of the intended user is recreated on transceiver station 414*b*. Thus, since the authentication is recreated on transceiver station 414*b*, the intended user does not have to be re-authenticated when mobile client 412 roams to the coverage area of transceiver station 414*b* via radio link 411*b* (or transceiver station 414*c* or transceiver station 414*d*).

Figure 7:
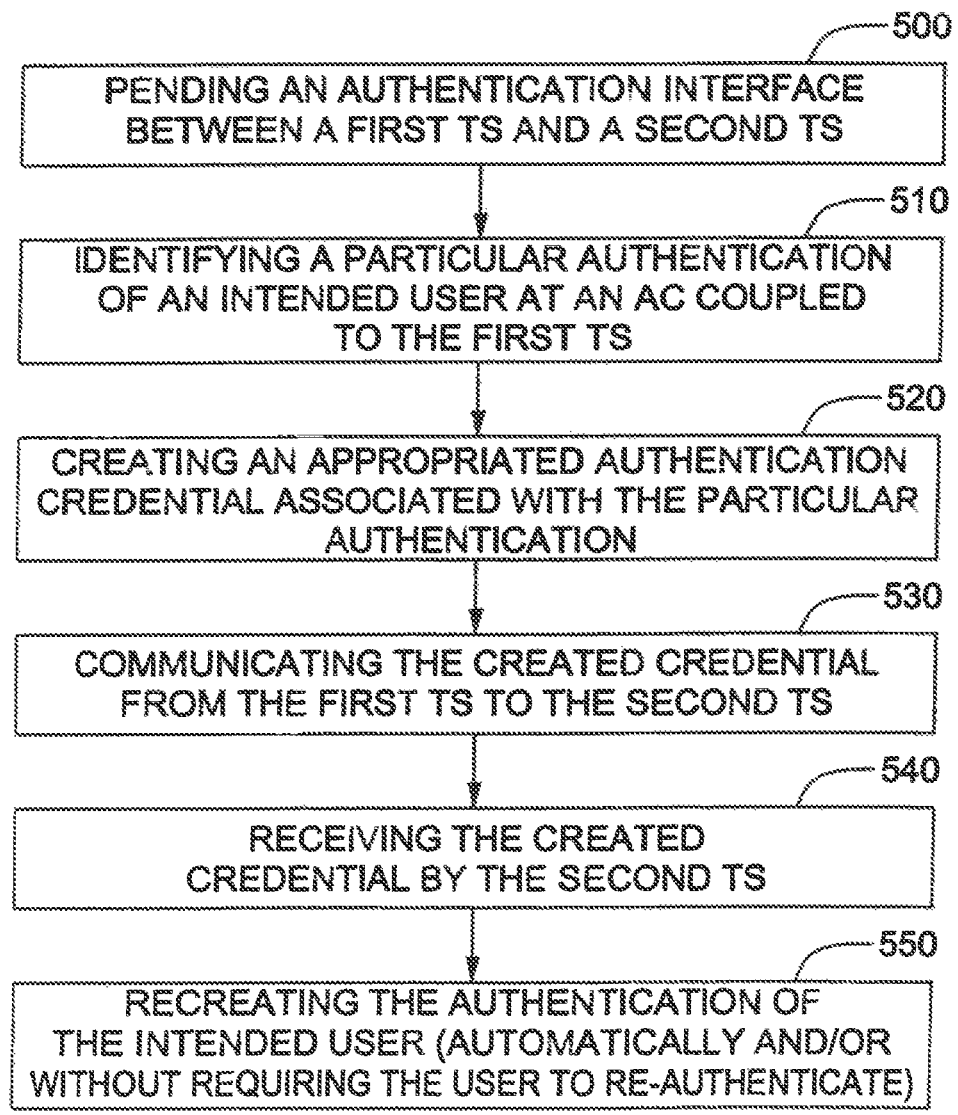
FIG. 7 is a flowchart representative of another embodiment of operations pursuant to aspects of the invention.

In general, according to the foregoing, the invention provides a method for exporting and importing an authentication credential in a roaming environment, as diagramed in FIG. 7. At block 500, an authentication interface between a first transceiver station and a second transceiver station is provided. At block 510, a particular authentication of an intended user at an authentication center coupled to the first transceiver station is identified. At block 520, the first transceiver station creates an appropriate authentication credential associated with the authentication of the intended user. At block 530, the first transceiver station communicates the created credential to the second transceiver station. At block 540, the second transceiver station receives from the first transceiver station the created credential. Then, at block 550, the authentication of the intended user is recreated at the second transceiver station using the received credential (automatically and/or without requiring the intended user to re-authenticate as the user's mobile client roams or moves to the second transceiver station). Thus, the method of FIG. 7 allows the authentication of the intended user to be recorded and provides the ability to move this authentication (including a revocation of this authentication) to a new transceiver station as the mobile client roams between different coverage areas.

Figure 8:
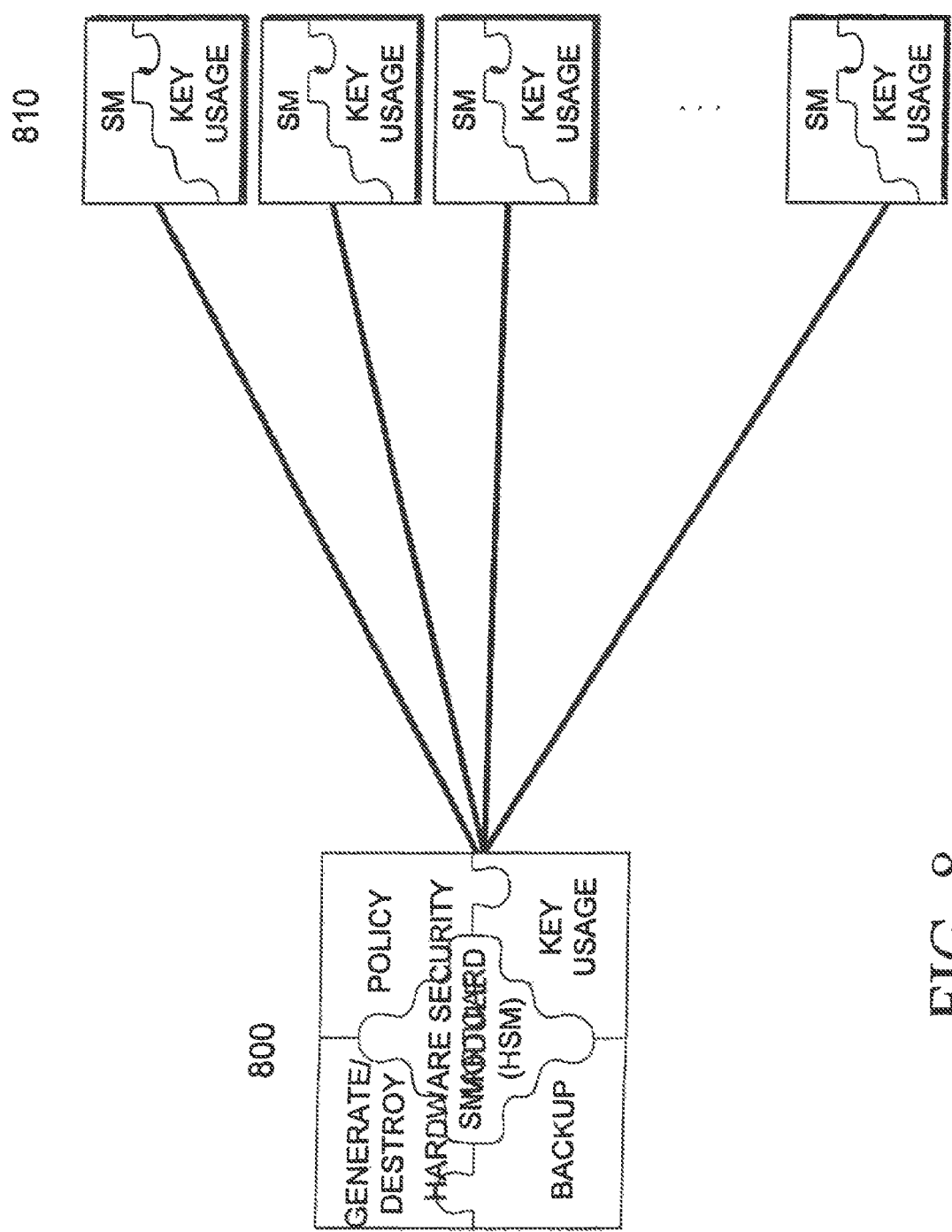
FIG. 8 is a schematic diagram of an embodiment of a key management system that incorporates stateless key management modules (or stateless modules) pursuant to aspects of the invention.

Referring now to FIG. 8, an embodiment of a key management system that incorporates stateless key management modules (hereafter referred to as stateless modules or SMs for convenience) is illustrated. In FIG. 8, smartcard 800 (e.g., a hardware security module or a SIM) is configured to manage multiple remote stateless modules (or SMs) 810.

Stateless modules may provide key enforcement and/or usage functions that are, in effect, separated out from the main key management functions provided by a smartcard. For example, a smartcard may provide all of the services for secure key management such as generating and destroying keys, establishing and enforcing key policy, using keys, providing key backup and secure key storage and communicating with peers. Inherently, these operations require that the smartcard keep track of its current state. For example, the smartcard must keep track of all keys it generated and it must maintain state information associated with each of these keys. This information may be used, for example, to determine the entity to which each key was issued and when to destroy or revoke keys. In contrast, the stateless modules provide a mechanism for securely receiving keys and using keys. The stateless modules do not generate keys or conduct peer-to-peer communication. Consequently, they typically must communicate with a key manager to obtain the keys needed by a mobile client (e.g., a mobile phone device, a PDA, etc.).

A stateless module does not need to maintain state information to receive keys and use keys. When a stateless module boots up, the only key information it has is an identity key that was stored in nonvolatile memory. However, this information is stateless because it never changes. To perform its tasks, the stateless module may be configured to establish a secure connection with a smartcard using its identity key. This secure connection enables the stateless module to perform the basic operations of receiving and using keys and/or data. These operations do not, however, require that the stateless module maintain the state of these keys. Rather, the stateless module merely needs to use the keys within a secure boundary and enforce any policy received with the key. As an example, after the smartcard securely sends keys to the stateless module these keys may be used to decrypt data and/or keys for a mobile client (e.g., a mobile phone device, a PDA, etc.). In addition, the stateless module may send secured (e.g., encrypted and/or authenticated) data to a designated device via a secure connection.

The stateless module provides a secure usage environment that may be remotely separated from, yet cryptographically secured to (e.g., using operations that may include encryption, decryption, authentication, etc.), the smartcard. In particular, keys and data within the stateless module are protected by hardware (e.g., the physical constraints provided by the integrated circuit, aka chip). In addition, the stateless module may be configured to prevent the keys and data from being exported from the chip without encryption (or in the clear). Moreover, as illustrated in FIG. 9, a key transfer protocol may be established between stateless module 910 and smartcard 900 to allow keys generated in smartcard 900 to be securely transferred to stateless module 910.

Figure 9:
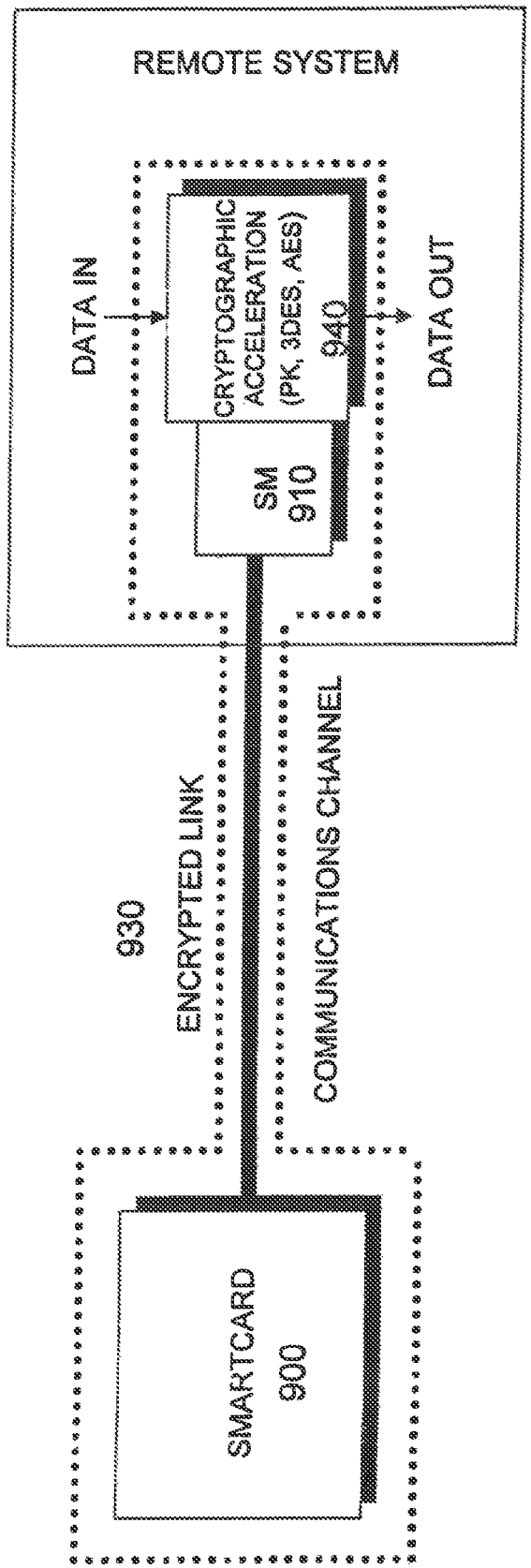
FIG. 9 is a schematic diagram of a key transfer embodiment between a stateless module and a smartcard pursuant to aspects of the invention.

As is shown in FIG. 9 (and discussed above), encrypted link (communication channel) 930 may be used to effectively extend the security boundary of smartcard 900 to include the stateless module 910. Encrypted link 930 allows for key material to be transferred over an insecure communication medium (i.e. network and/or Internet) between smartcard 900 and stateless module 910.

FIG. 9 also illustrates that stateless module 910 may receive encrypted key material from smartcard 900 for use with local cryptographic accelerator 940. Cryptographic accelerator 940 also may be implemented within the effective security boundary. For example, cryptographic accelerator 940 and stateless module 910 may be implemented on the same integrated circuit. Alternatively, keys and data transferred between these components may be encrypted.

Thus, cleartext and ciphertext may be sent to cryptographic accelerator 940 without exposing the key material outside of the security boundary. As a result, any key material that is decrypted locally by stateless module 910 may never be exposed outside the security boundary.

Typically, a stateless module is embedded inside a mobile client that uses cryptographic services. For example, the stateless module may be implemented in mobile clients or end-user devices, such as cell phones, laptops, etc., that need some form of data security. The stateless module should be integrated into other chips (e.g., a main processor) within these devices. In this way, the stateless module may provide cost effective remote key management for a mobile client (e.g., a mobile phone device, a PDA, etc.). The security boundary to this mobile client is contained and managed through the stateless module by the smartcard key management system with minimal impact on the rest of the mobile client.

To support the above described key management scheme (i.e., to provide a high level of security at a relatively low cost, while consuming a relatively small amount of space on a mobile client), a stateless module provides mechanisms for securely loading one or more keys into the stateless module, securely storing the keys and securely using the keys. Embodiments of exemplary stateless modules that provide such mechanisms are provided in copending provisional patent application Ser. No. 60/515,290, entitled Stateless Hardware Security Module, filed on Oct. 1, 2004, and assigned to the assignee of the present application, the entire contents of which are incorporated herein by reference.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, a system using SIM cards and GSM mobile network has been illustrated, but it should be apparent that the inventive concepts described above would be equally applicable to systems that use other types of smartcards and/or other types of mobile network. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. A communication network for authenticating a mobile client and for allowing the mobile client to communicate with a server as the mobile client roams from one communication cell to another communication cell, the communication network comprising:

a first base station controller coupled to a first transceiver station, the first transceiver station defining a first communication cell;

a second base station controller coupled to a second transceiver station, the second transceiver station defining a second communication cell;

an authentication center coupled to the first base station controller, the authentication center authenticating the mobile client, and creating a credential including a status of the authenticating; and an authentication interface coupled between the first base station controller and the second base station controller, wherein the authentication interface is configured for the first base station controller to communicate the credential including the status of the authenticating to the second base station controller, without communicating the credential including the status of the authenticating via the mobile client, as the mobile client roams from the first communication cell to the second communication cell, and wherein the second base station controller uses the credential including the status of the authenticating received from the first base station controller to make an access decision for the mobile client without re-authentication.

2. The communication network of claim 1, further comprising a central core having a master switching center, wherein the central core is coupled to the first and second base station controllers via the master switching center.

3. The communication network of claim 2, wherein the authentication center is not included within the central core, and wherein the authentication center is not coupled to the first base station controller via the central core.

4. The communication network of claim 2, further comprising:

a central authentication center included within the central core, and configured to transmit revocations of authentications of mobile clients to the first base station controller.

5. The communication network of claim 1, wherein the authentication interface is directly coupled between the first base station controller and the second base station controller and indirectly coupled between the first transceiver station and the second transceiver station.

6. The communication network of claim 1, wherein the authentication center includes a copy of a key stored in the mobile client and wherein the copy of the key authenticates the mobile client to utilize the first base station controller for communication.

7. The communication network of claim 6, wherein the key is stored within a subscriber identity module (SIM) card of the mobile client.

8. The communication network of claim 6, wherein the key is stored within a smartcard of the mobile client and wherein the smartcard is coupled to a stateless module for securely receiving and using keys.

9. The communication network of claim 8, wherein the stateless module provides a secure usage environment for receiving and using keys that are remotely separated from and cryptographically secured to the smartcard.

10. The communication network of claim 1, wherein communication from the authentication center to the second base station controller is via at least one other base station controller.

11. The communication network of claim 1, wherein the status in the communicated credential indicates a revocation of an authentication of the mobile client.

12. The communication network of claim 1, wherein the second base station controller uses the status in the credential received from the first base station controller to make the access decision.

13. A communication network for authenticating a mobile client in a roaming environment, the communication network comprising:
- a first transceiver station defining a first communication area within which the mobile client can communicate with a server;
- a second transceiver station defining a second communication area within which the mobile client can communicate with the server;
- an authentication center coupled to the first transceiver station, the authentication center authenticating the mobile client to the first transceiver station so that the mobile client can communicate with the server via the first transceiver station, and creating a credential including a status of the authenticating; and
- an authentication interface coupled between the first transceiver station and the second transceiver station;
- wherein the authentication interface is configured for the first transceiver station to communicate the credential including the status of the authenticating to the second transceiver station, without communicating the credential including the status of the authenticating via the mobile client, when the mobile client moves to utilize the second transceiver station for communication with the server, and wherein the second transceiver station uses the credential including the status of the authenticating received from the first transceiver station to make an access decision for the mobile client without re-authentication.

14. The communication network of claim 13, wherein the authentication center is not included within a central core, and wherein the authentication center is not coupled to the first transceiver station via the central core.

15. The communication network of claim 13, wherein communication from the authentication center to the second transceiver station is via at least one other transceiver station.

16. The communication network of claim 13, wherein the status in the communicated credential indicates a revocation of an authentication of the mobile client.

17. The communication network of claim 13, wherein the second transceiver station uses the status in the credential received from the first transceiver station to make the access decision.

18. A method for authenticating a mobile client and for allowing the mobile client to communicate with a server as the mobile client roams from one communication cell to another communication cell, the method comprising:
- coupling an authentication center to a first transceiver station defining a first communication cell;
- authenticating the mobile client to access the first transceiver station at the authentication center;
- providing an authentication interface between the first transceiver station and a second transceiver station defining a second communication cell;
- creating an appropriate authentication credential at the authentication center including a status of the authenticating;
- communicating the credential including the status of the authenticating from the first transceiver station to the second transceiver station via the authentication interface, wherein the communicating is not via the mobile client;
- receiving the credential by the second transceiver station; and
- using the received credential by the second transceiver station to make an access decision for the mobile client without re-authentication.

19. The method of claim 18, wherein the status in the received credential indicates a revocation of an authentication of the mobile client.

20. The method of claim 18, wherein the second transceiver station uses the status in the credential received from the first transceiver station to make the access decision.

* * * * *